United States Patent [19]
Radia et al.

[11] Patent Number: 5,848,233
[45] Date of Patent: Dec. 8, 1998

[54] METHOD AND APPARATUS FOR DYNAMIC PACKET FILTER ASSIGNMENT

[75] Inventors: Sanjay R. Radia, Fremont; Swee Boon Lim, Cupertino; Panagiotis Tsirigotis, Mountain View; Thomas K. Wong, Pleasanton; Robert J. Goedman, Palo Alto, all of Calif.; Michael W. Patrick, Assonet, Mass.

[73] Assignee: Sun Microsystems, Inc., Palo Alto, Calif.

[21] Appl. No.: 762,402

[22] Filed: Dec. 9, 1996

[51] Int. Cl.$^6$ ............................................ G06F 11/00
[52] U.S. Cl. ............................................ 395/187.01
[58] Field of Search ..................... 395/187.01, 188.01, 395/186, 200.33, 200.49, 200.51, 200.55, 200.68

[56] References Cited

U.S. PATENT DOCUMENTS

| | | | |
|---|---|---|---|
| 5,416,842 | 5/1995 | Aziz | 380/30 |
| 5,463,777 | 10/1995 | Bialkowski et al. | 395/600 |
| 5,606,668 | 2/1997 | Shwed | 395/187.01 |
| 5,623,601 | 4/1997 | Vu | 395/187.01 |
| 5,699,513 | 12/1997 | Feigen et al. | 395/187.01 |
| 5,720,033 | 2/1998 | Deo | 395/186 |

OTHER PUBLICATIONS

Brent D. Chapman, Elizabeth D. Zwicky, Building Internet Firewalls, Chapter 6 "Packet Filtering," pp. 131–188, (O'Reilley & Associates, 1995).

R. Droms, "Dynamic Host Configuration Protocol", *RFC 1541*, Bucknell University, Oct. 1993.

Ilja Bedner and Alex Ranous, "HP BIDS—Broadband Interactive Data Solution," Telecommunications Platform Operation, Hewlett–Packard, Proceedings of COMPCON '96, Feb. 25–28, 1996, pp. 39–44.

Mark Laubach, "To foster residential area broadband internet technology: IP datagrams keep going, and going, and going . . . ," Computer Communications, vol. 19, Sep. 1996, pp. 867–875.

Steven M. Bellovin and William R. Cheswick, "Networks Firewalls," IEEE Communications Magazine, vol. 32, No. 9, Sep. 1, 1994, pp. 50–57.

*Primary Examiner*—Robert W. Beausoliel, Jr.
*Assistant Examiner*—Scott T. Baderman
*Attorney, Agent, or Firm*—Graham & James LLP

[57] ABSTRACT

The present invention includes a method and apparatus for filtering IP packets based on events within a computer network. More specifically, the present invention includes a services management system, or SMS. The SMS manages network connections between a series of client systems and a router. An access network control server (ANCS) manages the configuration of the router. The SMS monitors activities or events that occur within the network. In response to these events, the SMS dynamically downloads filtering profiles to the ANCS. The ANCS then uses the downloaded filtering profiles to reconfigure the router. The router then uses the filtering rules to selectively discard or forward IP packets received from the client systems.

25 Claims, 6 Drawing Sheets

METHOD AND APPARATUS FOR DYNAMIC PACKET FILTER ASSIGNMENT

RELATED APPLICATIONS

The following co-pending patent applications, which were filed on Dec. 9, 1996, are related to the subject application and are herein incorporated by reference:
1. Application Ser. No. 08/763,234, entitled "Method and Apparatus for Client-Sensitive Name Resolution Using DNS" of Swee Boon Lim, Sanjay R. Radia, and Thomas Wong.
2. Application Ser. No. 08/762,393, entitled "Method and Apparatus for Access Control in a Distributed Multiserver Network Environment" of Thomas Wong, Sanjay R. Radia, Swee Boon Lim, Panagiotis Tsirigotis, and Rob Goedman.
3. Application Ser. No. 08/763,289, entitled "Load Balancing and Failover of Network Services" of Swee Boon Lim, Ashish Singhai, and Sanjay R. Radia.
4. Application Ser. No. 08/763,068, entitled "Secure DHCP Server" of Swee Boon Lim, Sanjay R. Radia, Thomas Wong, Panagiotis Tsirigotis, and Rob Goedman.
5. Application Ser. No. 08/763,212, entitled "A Method to Activate Unregistered Systems in a Distributed Multiserver Network Environment" of Thomas Wong and Sanjay R. Radia.
6. Application Ser. No. 08/762,709, entitled "A Method and Apparatus for Assignment of IP Addresses" of Thomas Wong, Swee Boon Lim, Sanjay R. Radia, Panagiotis Tsirigotis, Rob Goedman and Michael W. Patrick.
7. Application Ser. No. 08/762,933, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick.
8. Application Ser. No. 08/762,705, entitled "Dynamic Cache Preloading Across Loosely Coupled Administrative Domains" of Panagiotis Tsirigotis and Sanjay R. Radia.

The following co-pending patent application is related to the subject application and is herein incorporated by reference:
9. U.S. application Ser. No. 08/673,951, filed Jul. 1, 1996, entitled "A Name Service for a Redundant Array of Internet Servers" of Swee Boon Lim.

FIELD OF THE INVENTION

The present invention relates generally to security in computer networks. More specifically, the present invention is a method and apparatus that allows IP packets within a network to be selectively filtered based on events within the network.

BACKGROUND OF THE INVENTION

Recent years have witnessed an explosive growth in the use of computer networks. In fact, the use of computer networks to connect disparate computer systems around the world has become a routine and accepted fact. One result of the ever-increasing use of computer networks is an ever-increasing need for security systems.

Computer networks that use the Internet protocol are commonly referred to as IP networks. Within IP networks, messages are sent and received using discrete quanta known as "packets." Each packet includes a header and a body. Messages are sent by partitioning the message and including each portion of the partitioned message in the body of a packet. The packets are sent over the IP network and reassembled into the message at the receiving system.

Packet filters are programs that examine the data included in packet headers and discard packets that appear to present a threat to network security. For example, assume that a company uses a router to link its internal intranet with an external network, such as the Internet. Typically, a router used in this configuration will inspect the header of each received packet to determine the address of the system sending the packet. Clearly, in this case, packets that arrive from the Internet but that have source addresses that correspond to addresses of systems within the company intranet are suspect. A packet filter included in the router would, therefore, discard packets of this type. Filtering can be based on the target of the packet, the higher level protocol or other packet content.

In general, the use of packet filters has been found to be an effective and relatively simple technique for increasing security within computer networks. Unfortunately, there are also some disadvantages associated with traditional packet filtering techniques. One such disadvantage results from the static nature of traditional packet filtering systems. It has generally been the case that packet filtering systems are configured using a fixed set of filtering rules. These rules are then used to filter packets within the network and remain in effect until the packet filtering system is reconfigured. Since reconfiguration of the packet filtering system is relatively rare, the particular filtering rules that are in effect within a particular network are generally of a fixed and static nature.

For example, in the scenario, the access control rules are fairly static. External packets (packets from the Internet) are allowed very restricted access. Internal packets (from within the Internet) are allowed fairly static access to certain parts of the internal network. As machines are added/removed or moved then the filtering rules may be changed. Once further minimize the changes to filtering rules by using subnetwork fields in the filtering rules. E.g. instead of saying that access is allowed to a host with address xyz, one says that access is allowed to hosts with address xy*. This allows the target machine to be moved within the subnetwork or even new ones to be added.

Now consider a more dynamic system where one wants to control access based on certain events such as the user's connected to the network. For example, an internet service provider (ISP) may have users who connect, login, logoff and disconnect to its network over time using telephone or able modems. The ISP would like to control access to this dynamically changing set of users. Furthermore, different users may be allowed different access based on who the user is and what set of services the user as subscribed. As a result, the quality of packet filtering provided by traditional packet filtering systems is often less than optimal.

SUMMARY OF THE INVENTION

A preferred embodiment of the present invention includes a method and apparatus for filtering IP packets based on events within the network. More specifically, a preferred environment for the present invention is a computer network that includes a series of client systems and a router. An access network control server (ANCS) controls configuration of the router and the components of the network that forward packets from the client systems. A services management system (SMS), dynamically reconfigures the ANCS. The network also includes a DHCP server that implements the Dynamic Host Configuration Protocol (DHCP) defined in Internet RFC 1541. The client systems, which are typically personal computers using cable modems, connect to the router. As part of the connection process, each client system receives a dynamically allocated IP address from the DHCP server.

The SMS maintains a series of filtering profiles, each of which includes one or more of filtering rules. The SMS sets a default filter sequence for the newly connected client system by downloading the sequence by the SMS to the ANCS. The ANCS uses the rules included in the downloaded login filtering profile sequence to establish a packet filter for IP packets originating from the newly connected client system. Whenever the ANCS establishes a new packet filter for a client system, any packet filter previously established for the same client system is discarded. The packet filter is established by reconfiguring the components of the network that forward packets originating at the client system, such as the router or the modem connected to the client system. Subsequently, the packet filter uses the rules of the login filtering profile sequence to selectively forward or discard IP packets originating from the client system. This filtering sequence will allow newly connected client systems to perform login, but nothing else.

In the above description, we have set a default profile called the default login profile. The default login profile is a static profile that applies to ALL newly connected client systems. This way the SMS does not need to be aware as new client systems are connected.

One may also consider setting the default profile to a null profile and for each client system as the client system connects; for example, since a client system that connects may do a DHCP operation, this event can trigger the SMS to set the login profile for the newly connected computer.

A preferred embodiment of the present invention also generates or selects filtering profiles for users. With the login filtering profile sequence in place, a user can use the newly connected client system to login to the network. The user login is monitored by the SMS. If the user login is successful, the SMS selects or generates a user filtering profile sequence. The user filtering profile sequence is then downloaded by the SMS to the ANCS. The ANCS uses the rules included in the downloaded login filtering profile sequence to establish a new packet filter for IP packets originating from the newly logged in client system. The new packet filter is established by reconfiguring the components of the network to replace the packet filter established for the login filtering profile. Subsequently, the new packet filter uses the rules of the user filtering profile sequence to selectively forward or discard IP packets originating from the client system.

Note that in the above description we have used the events of connecting a client system, logging in, and logging out as events that trigger the SMS to change filtering rules. In other environments other events may be used to trigger the setting of filter rules.

We have described the SMS as a single computer system that sets the filter rules. One may consider the SMS to be a set of machines that collectively set filter rules in different part of the computer network.

Similarly, we have described the ANCS as a single computer but it may also be a set of computers that can be used to control the router and the components of the network that forwards packets from client systems.

In accordance with the purpose of the invention, as embodied and broadly described herein, the present invention is a method for filtering IP packets in a computer network that includes one or more client systems, the method comprising the steps, performed by one or more computer systems, of: detecting an event associated with one of the client systems, selecting one or more filtering rules based on the type of event detected, and establishing a packet filter in the computer network, the packet filter using the selected rules to selectively discard packets originating at the client system associated with the detected event.

In further accordance with the purpose of the invention, as embodied and broadly described herein, the present invention is an apparatus for filtering IP packets in a computer network that includes one or more client systems, the apparatus comprising: a first portion configured to cause a computer system to detect an event associated with one of the client systems, a second portion configured to cause a computer system to provide one or more filtering rules based on the type of event detected, and a third portion configured to cause a computer system to establish a packet filter in the computer network, the packet filter using the selected rules to selectively discard packets originating at the client system associated with the detected event.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the present invention, examples of which are illustrated in the accompanying drawings. Wherever possible, the same reference numbers will be used throughout the drawings to refer to the same or like parts.

Figure 1:
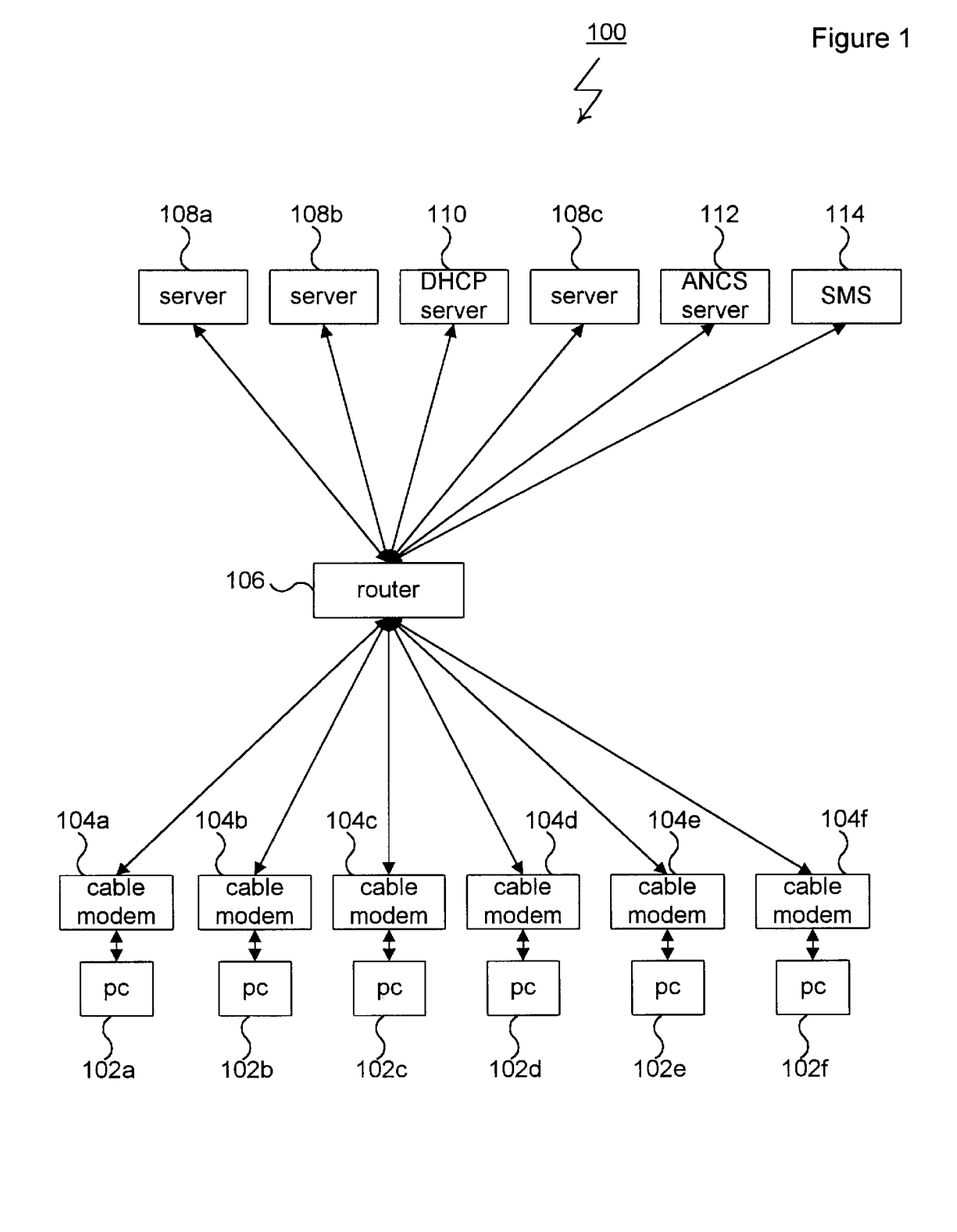
FIG. 1 is a block diagram of a computer network shown as a representative environment for a preferred embodiment of the present invention.

In FIG. 1, a computer network 100 is shown as a representative environment for the present invention. Structurally, computer network 100 includes a series of client systems 102, of which client systems 102a through 102f are representative. Each client system 102 may be selected from a range of differing devices including, but not limited to the personal computers shown in FIG. 1. Preferably, each client system 102 is limited to a single user at any given time. A cable modem 104 is connected to each client system 102. Each cable modem 104 is connected, in turn, to a cable router 106. The use of cable router 106 and cable modems 104 is also intended to be exemplary and it should be appreciated that other networking technologies and topologies are equally practical. It should also be appreciated that a number of different cable modems and cable routers are available from various manufactures In particular, cable modem 104 can be a CyberSUFR cable modem and cable router 106 can be a CableMASTR cable router, both supplied by Motorola, Inc.

Network 100 also includes a series of server systems 108, of which server systems 108a through 108a are representative. Each server system 108 is connected to cable router 106. Generally, server systems 108 are intended to represent the broad range of server systems that may be found within computer networks.

A DHCP server system 110 is also included in computer network 100 and connected to cable router 106. DHCP server system 110 is a computer or other system that implements Dynamic Host Configuration Protocol (DHCP) defined in Internet RFC 1541. Functionally, DHCP server system 110 provides for allocation of IP addresses within network 100. When client systems 102 initially connect to cable router 106, each client system 102 requests and receives an IP address from DHCP server system 110. Although FIG. 1 shows only a single DHCP server system 110, it is to be understood that additional DHCP server systems 110 may be used without departing from the spirit of the present invention.

Figure 2:
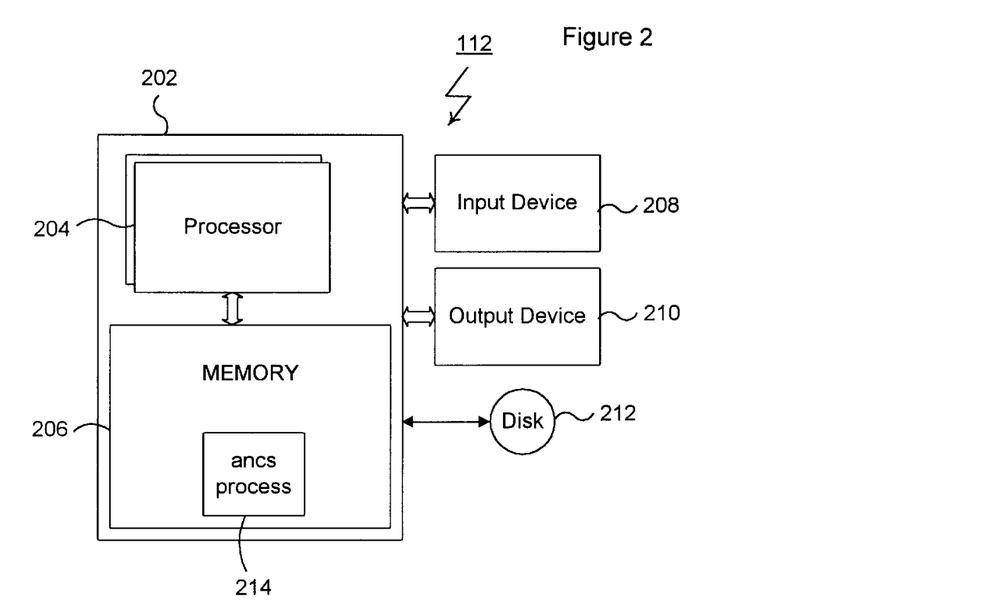
FIG. 2 is a block diagram of an access network control server as used by a preferred embodiment of the present invention.

Computer network 100 also includes an access network control server (ANCS) 112 and a services management system (SMS) 114. Both ANCS 112 and SMS 114 are connected to cable router 106. ANCS 112 is shown in more detail in FIG. 2 to include a computer system 202 that, in turn, includes a processor, or processors 204, and a memory 206. An input device 208 and an output device 210 are connected to the computer system 202 and represent a wide range of varying I/O devices such as disk drives, keyboards, modems, network adapters, printers and displays. A disk drive 212, of any suitable disk drive type, is shown connected to computer system 202. An ANCS process 214 is shown to be resident in memory 206 of computer system 202.

Figure 3:
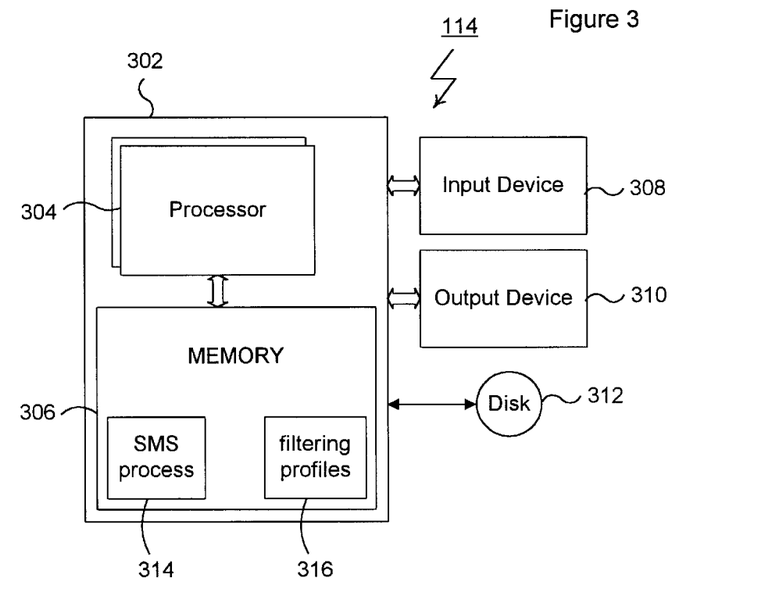
FIG. 3 is a block diagram of a services management system as used by a preferred embodiment of the present invention.

SMS 114 is shown in more detail in FIG. 3 to include a computer system 302 that, in turn, includes a processor, or processors 304, and a memory 306. An input device 308 and an output device 310 are connected to the computer system 302 and represent a wide range of varying I/O devices such as disk drives, keyboards, modems, network adapters, printers and displays. A disk drive 312, of any suitable disk drive type, is shown connected to computer system 302. An SMS process 314 and a filtering profile database 316 are shown to be resident in memory 306 of computer system 302. In FIG. 1, ANCS 112 and SMS 114 are shown as separate entities. It should be appreciated, however, that the present invention specifically anticipates that ANCS 112 and SMS 114 may be implemented using a single computer system that includes ANCS process 214, SMS process 314 and filtering profile database 316.

Figure 4:
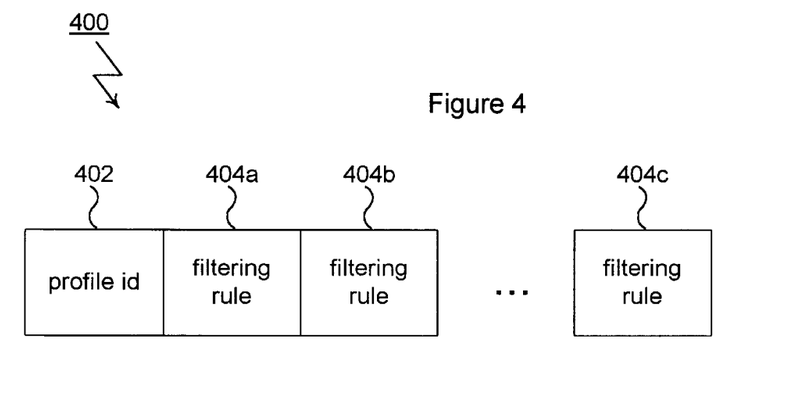
FIG. 4 is a block diagram of a filtering profile as used in a preferred embodiment of the present invention.
Figure 5:
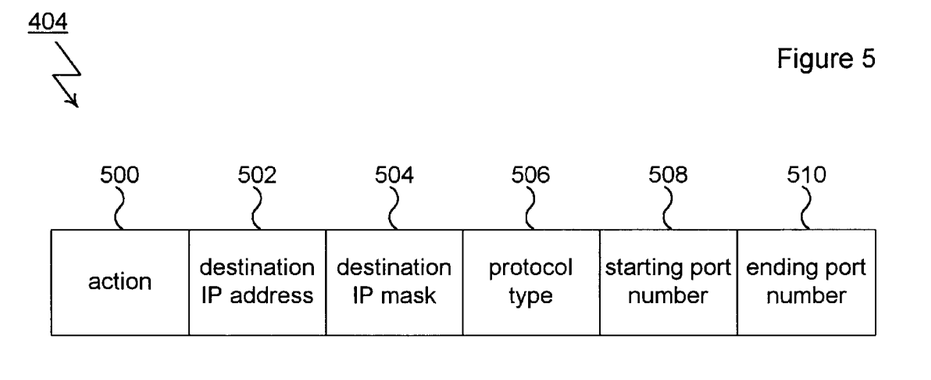
FIG. 5 is a block diagram of a filtering rule as used in a preferred embodiment of the present invention.

The filtering profile database 316 of SMS 114 includes a set of filtering profiles of the type shown in FIG. 4 and generally designated 400. Filtering profile 400 includes a profile id 402 and a series of filtering rules, of which filtering rules 404a through 404c are representative. The profile id 402 is used by SMS 114 and ANCS 112 as an internal identifier for the filtering profile 400. The filtering rules 404 included in a filtering profile 400 are better understood by reference to FIG. 5. In FIG. 5, it may be seen that each filtering rule 404 includes an action 500. Action 500 specifies the disposition of IP packets that match by a particular filtering rule 404. In particular, action 500 may indicate that a matched IP packet will be forwarded, or that a matched IP packet will be discarded. Filtering rule 404 also includes a destination IP address 502 and a destination IP mask 504. Destination IP address 502 corresponds to the destination address included in the header of an IP packet. Destination IP mask 504 is similar to destination IP address 502 but corresponds to a range of destination addresses. To match a particular filtering rule 404, an IP packet must either have a destination address that matches the destination address 502 included in the filtering rule 404 or have a destination address that is covered by the destination address mask 504 of the filtering rule 404.

Filtering rule 404 also includes a protocol type 506. Protocol type 506 corresponds to the protocol type of an IP packet. Thus, the protocol type 506 of each filtering rule 404 has a value that corresponds to an IP packet type, such as TCP, UDP, ICMP, etc. To match a particular filtering rule 404, an IP packet must have a protocol type that matches the protocol type 506 included in the filtering rule 404

Finally, for the embodiment shown, filtering rule 404 includes a starting port number 508 and an ending port number 510. Starting port number 508 and ending port number 510 define a range of port numbers of the type used by certain protocols, such as UDP and TCP. To match a particular filtering rule 404, an IP packet of one of these types must have a port number that falls within the range defined by starting port number 508 and ending port number 510.

Figure 6:
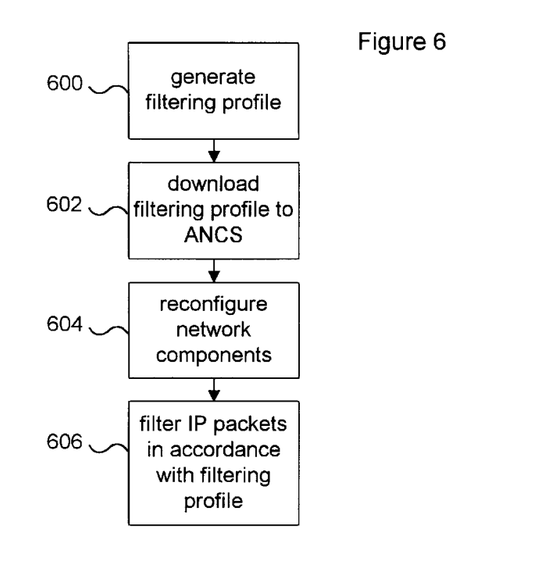
FIG. 6 is a flowchart showing an overview of the steps associated with the use of the filtering profiles of a preferred embodiment of the present invention.

The use of filtering profiles 400 by the present invention is shown generally in FIG. 6. In step 600 of FIG. 6, SMS 114 generates a filtering profile 400. For the purposes of illustration, it may be assumed that the filtering profile 400 is intended to allow client system 102b to send UDP packets to port 63 of server system 108c. Therefore, the filtering profile 400 generated in step 600 includes a single filtering rule 404. The single filtering rule 404 includes an action 500 indicating that IP packets that match the filtering rule 404 should be forwarded. Additionally, the filtering rule 404 includes a destination address 502 that corresponds to the IP address of server system 108c. The destination address mask 504 of filtering rule 404 is set to 255.255.255.255 (255.255.255.255 matches all IP addresses) and the protocol type 506 of filtering rule 404 is set to UDP. Finally, the starting port number 508 and ending port number 510 of filtering rule 404 are both set to 63.

In step 602 of method 600, the filtering profile 400 is downloaded by the SMS 114 to the ANCS 112. At the same time, the SMS 114 also passes the IP address of client system 102b to the ANCS 112. In step 604, the ANCS 112 uses the single filtering rule 404 included in the filtering profile 400 to establish a packet filter for IP packets originating from the client system 102b. The packet filter is established by reconfiguring one or more of the components of the network 100 that forward packets originating at the client system 102b. For example, in some cases the packet filter may be established by reconfiguring the modem 104b connected to client system 102. Alternatively, the packet filter may be established by reconfiguring router 106.

In step 606, the packet filter established by the ANCS 112 in step 604 is used to filter packets that originate from the client system 102b. More specifically, each packet that originates from client system 102b is examined. Packets that do not include a destination address that corresponds to server system 108c are discarded. Likewise packets that do not have a protocol type of UDP or a port number of 63 are discarded.

Figure 7:
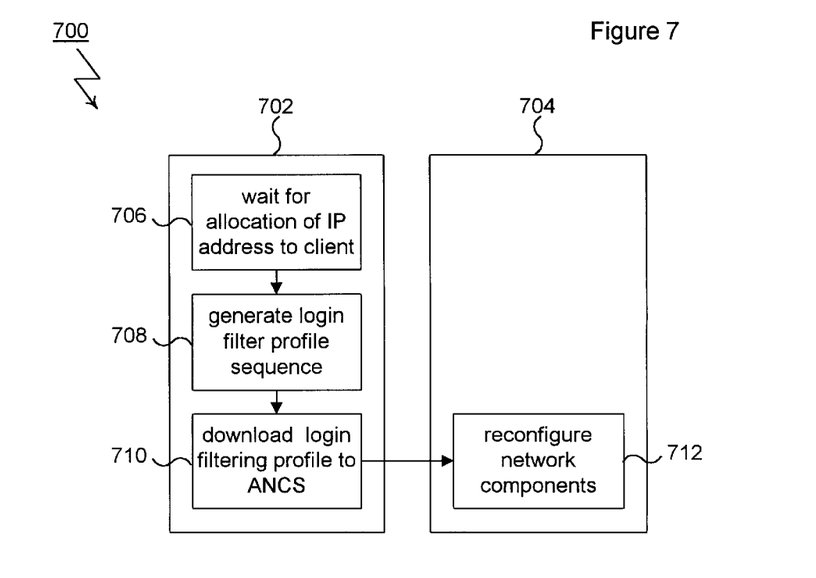
FIG. 7 is a flowchart showing the steps associated with a preferred embodiment of a method for user login to a computer network.

A more complete example of the use of filtering profiles 400 by the present invention is shown as method 700 of FIG. 7. Method 700 includes step performed by SMS 114 and ANCS 112. For convenience, these steps are grouped into an SMS context 702 and an ANCS context 704. Method 700 begins with step 706 where SMS 114 waits for the allocation of an IP address to a client system 102. More specifically, for a preferred embodiment of network 100, power-on or reset of a client system 102 is followed by connection of the client system 102 to router 106. As part of this connection, the connecting client system 102 requests and receives a dynamically allocated IP address from DHCP server 110. This allocation requires that a number of messages pass between DHCP server 110 and the client system 102 requesting a new IP address. The last of these messages is a DHCPACK message sent by the DHCP server 110 to the client system 102. To monitor the allocation of IP addresses, SMS 114 monitors DHCP messages within network 100. Step 706 corresponds, in a general sense, to the methods and procedures that are executed by SMS 114 to wait for and detect DHCPACK messages within network 100.

In step 708, SMS 114 generates a sequence of one or more "login" filtering profiles 400 for the newly connected client system 102. Functionally, the purpose of the login filtering profiles 400 is to restrict the type of IP packets that may originate at the newly connected client system 102. Specifically, only the packet types that are required for a user to login to network 100 are allowed. Generally, the type of IP packets required for a user login will vary between different networks. For network 100, however, it may be assumed that four filtering profiles 400 are generated in step 708.

The first of the four login filtering profiles 400 forwards packets associated with DHCP lease renewal. More specifically, in systems that use the DHCP protocol for allocation of IP addresses, each IP address is allocated for a finite period of time. Systems that do not renew their IP address leases may lose their allocated IP addresses. Therefore, the first login filtering profile 400 allows passage of IP packets from the newly connected client system 102 to the DHCP server 110 for the purpose of DHCP lease renewal. Preferably, the first filtering profile 400 includes a single filtering rule 404 of the form shown in FIG. 8a.

Figure 8A:
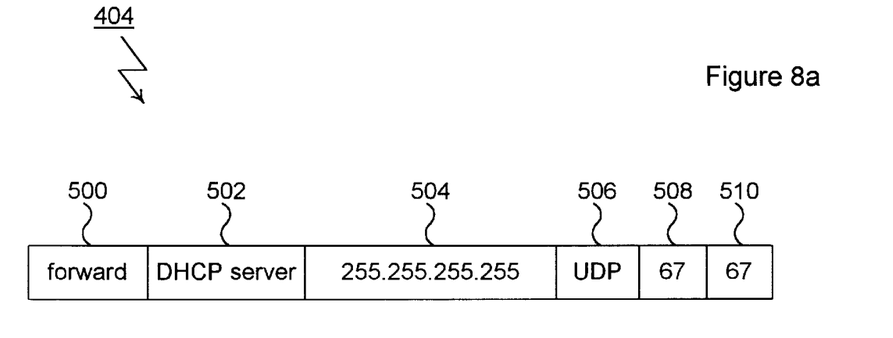
FIGS. 8a through 8d are block diagrams showing filtering profiles associated with a preferred method for user login to a computer network.

More specifically, and as shown in FIG. 8a, the single filtering rule 404 for DHCP lease renewal includes an action 500 that indicates that IP packets that match the filtering rule 404 should be forwarded. Filtering rule 404 also includes a destination address 502 that corresponds to the IP address of the DHCP server 110 and a destination address mask 504 of 255.255.255.255. As a result, only IP packets directed at DHCP server 110 match filtering rule 404. A protocol type of UDP is specified by protocol type 506 of filtering rule 404. Finally, beginning port number 508 and ending port number 510 are both set to "67" corresponding to the standard port used for DHCP messages.

The second of the login filtering profiles 400 forwards packets associated with DNS (domain name service) address resolution. More specifically, in systems that use the DNS protocol, symbolic names are translated to IP address by a DNS server system. Client systems 102 request translations of symbolic names by sending messages to their DNS servers. Therefore, the second login filtering profile 400 allows passage of IP packets from the newly connected client system 102 to a DNS server system (DNS server system not shown).

Figure 8B:
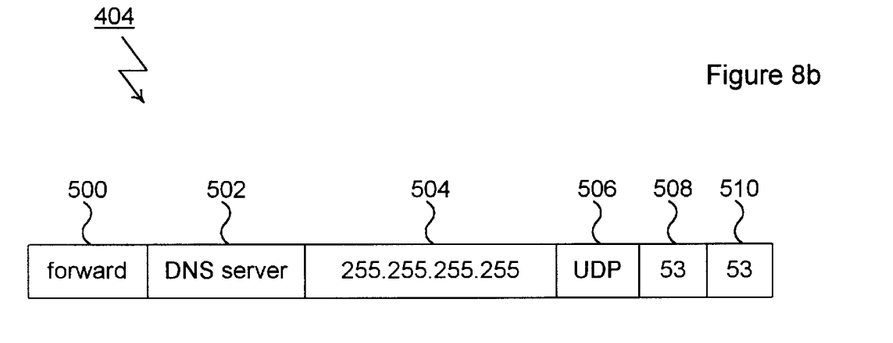

Preferably, the second filtering profile 400 includes a single filtering rule 404 of the form shown in FIG. 8b. More specifically, and as shown in FIG. 8b, the single filtering rule 404 for DNS name resolution includes an action 500 that indicates that IP packets that match the filtering rule 404 should be forwarded. Filtering rule 404 also includes a destination address 502 that corresponds to the IP address of a DNS server system and a destination address mask 504 of 255.255.255.255. As a result, only IP packets directed at the DNS server system match filtering rule 404. A protocol type of UDP is specified by protocol type 506 of filtering rule 404. Finally, beginning port number 508 and ending port number 510 are both set to 53 corresponding to the standard port used for DNS messages.

Figure 8C:
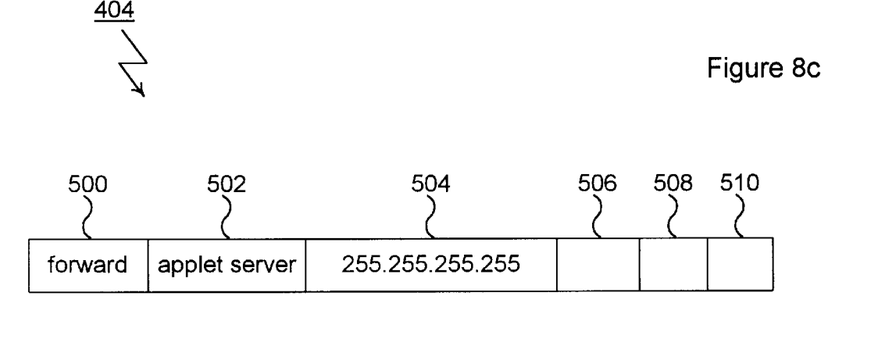

For a preferred embodiment of network 100, user logins are handled by downloading small, specifically tailored applications, known as "login applets," to client systems 102. The login applets are downloaded from a server system, such as server system 108, or in some cases, from SMS 114. To allow the login applet to be downloaded, the third of the login filtering profiles 400 forwards packets associated with a request for login applet download. Preferably, the third filtering profile 400 includes one filtering rule 404 for each server from which the login applet may be downloaded. More specifically, and as shown in FIG. 8c, the filtering rule 404 for login applet download includes an action 500 that indicates that IP packets that match the filtering rule 404 should be forwarded. Each filtering rule 404 also includes a destination address 502 that corresponds to the IP address of a server system from which the login applet may be downloaded. The destination address mask of filtering rule 404 is set to 255.255.255.255. The protocol type 506, beginning port number 508 and ending port number 510 of filtering rule 404 are all set to values known by SMS 114 to be appropriate for the download of the login applet.

Figure 8D:
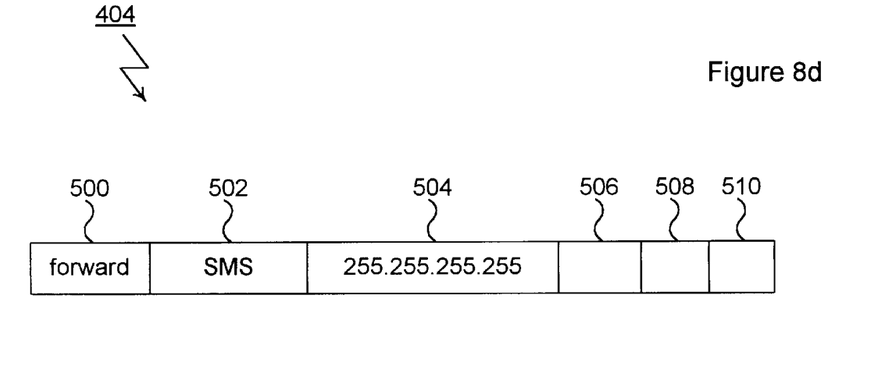

In the described embodiment of the network 100, the login applet communicates with a login server such as SMS 114. To enable this communication, the fourth of the login filtering profiles 400 forwards packets associated with login applet communication. Preferably, the fourth filtering profile 400 includes one filtering rule 404 for each login server such as SMS 114. More specifically, and as shown in FIG. 8d, the filtering rule 404 for login applet communication includes an action 500 that indicates that IP packets that match the filtering rule 404 should be forwarded. Filtering rule 404 also includes a destination address 502 that corresponds to the IP address of a login server such as SMS 114. The destination address mask of filtering rule 404 is set to 255.255.255.255. The protocol type 506, beginning port number 508 and ending port number 510 of filtering rule 404 are all set to values known by SMS 114 to be appropriate for login applet communication.

In the preceding paragraphs, a sequence of four filtering profiles 400 has been described. It may be appreciated from the preceding paragraphs that each of the four filtering profiles 400 is generally applicable to enable login processing for any of the client systems 102. Because of the general applicability of the four filtering profiles 400, it is preferable for step 708 to generate these filtering profiles 400 using a standardized template making only minor modifications, if necessary, for each client system 102.

Step 708 is followed by step 710 where the sequence of four filtering profiles 400 is downloaded by SMS 114 to ANCS 112. At the same time, the IP address of the newly connected client system 102 (for which the sequence of four filtering profiles 400 was generated) is passed by the SMS 114 to the ANCS 112. In the following step, the ANCS 112 uses each of the filtering rules 404 included in the sequence of four filtering profiles 400 to establish a packet filter for IP packets originating from the newly connected client system 102. The packet filter is established by reconfiguring one or more of the components of the network 100 that forward packets originating at the newly connected client system 102. For example, in some cases, the packet filter may be established by reconfiguring the modem 104 connected to client system 102. Alternatively, the packet filter may be established by reconfiguring router 106. Preferably, ANCS 112 reconfigures the network components using a protocol that is generally applicable to components of network 100, such as the simple network management protocol (SNMP). Subsequently, the packet filter established by the ANCS 112 is used to filter IP packets that originate from the client system 102, allowing packet types generally associated with the login of a user to network 100.

Figure 9:
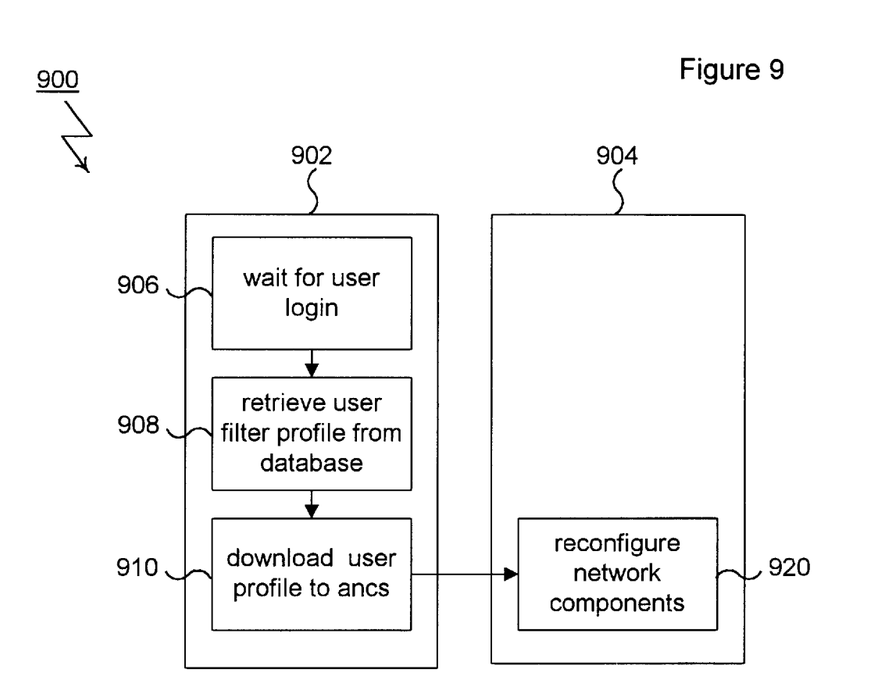
FIG. 9 is a flowchart showing the steps associated with a preferred embodiment of a method for allocation of privileges to a user in a computer network.

A second example of the use of filtering profiles 400 by the present invention is shown as method 900 of FIG. 9. Method 900 includes step performed by SMS 114 and ANCS 112. For convenience, these steps are grouped into an SMS context 902 and an ANCS context 904. Method 900 begins with step 906 where SMS 114 waits for a user login. More specifically, as discussed with regard to method 700, for a preferred embodiment of network 100, users login to network 100 using a login applet that communicates with a login server, such as SMS 114. Step 114 corresponds, in a general fashion, to the methods and procedures that are executed by SMS 114 to wait for the login of a user to network 100.

In step 908, which follows, a sequence of filtering profiles 400 associated with the user are retrieved, by SMS 114, from filtering profile database 316. In general, it may be appreciated that various users of network 100 will have varying types of allowed access. As a result, different network users will require different filtering profiles 400. Generally, these filtering profiles 400 are defined separately for each user using either automatic or manual generation techniques. For the present invention, these filtering profiles 400 are preferably maintained in filtering profile database 316 and retrieved using the identity of the particular user. Step 908 corresponds to the methods and procedures that are executed by SMS 114 to retrieve the filtering profiles 400 associated with the user from the filtering profile database 316.

Step 908 is followed by step 910 where the sequence of user filtering profiles 400 is downloaded by SMS 114 to ANCS 112. At the same time, the IP address of the client system 102 acting as a host for the user is passed by the SMS 114 to the ANCS 112. In the following step, the ANCS 112 uses each of the filtering rules 404 included in the sequence of user filtering profiles 400 to establish a packet filter for IP packets originating from the client system 102 acting as a host for the user. The packet filter is established by reconfiguring one or more of the components of the network 100 that forward packets originating at the client system 102 acting as a host for the user. For example, in some cases, the packet filter may be established by reconfiguring the modem 104 connected to client system 102. Alternatively, the packet filter may be established by reconfiguring router 106. Preferably, ANCS 112 reconfigures the network components using a protocol that is generally applicable to components of network 100, such as the simple network management protocol (SNMP). Subsequently, the packet filter established by the ANCS 112 is used to filter IP packets that originate from the client system 102 acting as a host for the user, allowing the packets that are associated with the network privileges of the user.

Although not shown, it may be appreciated that the network 100 may be reconfigured to reestablish a default state after the user logs out from the client system 102.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for filtering IP packets in a computer network that includes one or more client systems, the method comprising the steps, performed by one or more computer systems, of:

detecting an event associated with one of the client systems;

selecting one or more filtering rules based on the type of event detected; and establishing a packet filter in the computer network, the packet filter using the selected rules to selectively discard packets originating at the client system associated with the detected event.

2. A method as recited in claim 1 wherein the detected event is the assignment of an IP address to the client system.

3. A method as recited in claim 1 wherein the detected event is the login of a user using the client system associated with the detected event.

4. A method as recited in claim 1 wherein the computer network includes a router and wherein the step of establishing a packet filter includes the step of reconfiguring the router to selectively discard packets originating at the client system associated with the detected event.

5. A method as recited in claim 1 wherein the client system associated with the detected event is connected to the network using a cable modem and wherein the step of establishing a packet filter includes the step of reconfiguring the cable modem to selectively discard packets originating at the client system associated with the detected event.

6. A method as recited in claim 1 wherein the step of selecting one or more filtering rules further comprises the step of generating the filtering rules using a standardized template.

7. A method as recited in claim 1 wherein the step of selecting one or more filtering rules further comprises the step of selecting the filtering rules from a database.

8. A computer program product comprising:

a computer usable medium having computer readable code embodied therein for filtering IP packets in a computer network that includes one or more client systems, the computer program product comprising:

first computer readable program code devices configured to cause a computer system to detect an event associated with one of the client systems;

second computer readable program code devices configured to cause a computer system to provide one or more filtering rules based on the type of event detected; and third computer readable program code devices configured to cause a computer system to establish a packet filter in the computer network, the packet filter using the selected rules to selectively discard packets originating at the client system associated with the detected event.

9. A computer program product as recited in claim 8 wherein the detected event is the assignment of an IP address.

10. A computer program product as recited in claim 8 wherein the detected event is the login of a user using the client system associated with the detected event.

11. A computer program product as recited in claim 8 wherein the computer network includes a router and wherein the third computer readable program code devices includes computer readable program code devices configured to cause a computer system to reconfigure the router to selectively discard packets originating at the client system associated with the detected event.

12. A computer program product as recited in claim 8 wherein the client system associated with the detected event is connected to the network using a cable modem and wherein the third computer readable program code devices includes computer readable program code devices configured to cause a computer system to reconfigure the cable modem to selectively discard packets originating at the client system associated with the detected event.

13. A computer program product as recited in claim 8 wherein the second computer readable program code devices includes computer readable program code devices configured to cause a computer system to generate the filtering rules using a standardized template.

14. A computer program product as recited in claim 8 wherein the second computer readable program code devices includes computer readable program code devices configured to cause a computer system to select the filtering rules from a database.

15. An apparatus for filtering IP packets in a computer network that includes one or more client systems, the apparatus comprising:

a first portion configured to cause a computer system to detect an event associated with one of the client systems;

a second portion configured to cause a computer system to provide one or more filtering rules based on the type of event detected; and a third portion configured to cause a computer system to establish a packet filter in the computer network, the packet filter using the selected rules to selectively discard packets originating at the client system associated with the detected event.

16. An apparatus as recited in claim 15 wherein the detected event is the assignment of an IP address.

17. An apparatus as recited in claim 15 wherein the detected event is the login of a user using the client system associated with the detected event.

18. An apparatus as recited in claim 15 wherein the computer network includes a router and wherein the third portion includes a fourth portion configured to cause a computer system to reconfigure the router to selectively discard packets originating at the client system associated with the detected event.

19. An apparatus as recited in claim 15 wherein the client system associated with the detected event is connected to the network using a cable modem and wherein the third portion includes a fourth portion configured to cause a computer system to reconfigure the cable modem to selectively discard packets originating at the client system associated with the detected event.

20. An apparatus as recited in claim 15 wherein the second portion includes a fourth portion configured to cause a computer system to generate the filtering rules using a standardized template.

21. An apparatus as recited in claim 15 wherein the second portion includes a fourth portion configured to cause a computer system to select the filtering rules from a database.

22. An apparatus as recited in claim 15 wherein each filtering rule includes a protocol type.

23. An apparatus as recited in claim 15 wherein each filtering rule includes a destination address.

24. An apparatus as recited in claim 15 wherein each filtering rule includes a destination mask.

25. An apparatus as recited in claim 15 wherein each filtering rule includes a range of destination port numbers.

* * * * *

UNITED STATES PATENT AND TRADEMARK OFFICE
CERTIFICATE OF CORRECTION

PATENT NO. : 5,848,233
DATED : December 8, 1998
INVENTOR(S) : Radia et al.

It is certified that error appears in the above-identified patent and that said Letters Patent is hereby corrected as shown below:

Title Page, item:

[73] Assignee: Sun Microsystems, Inc., Palo Alto, Calif. and Motorola, Inc., Schaumburg, IL Signed and Sealed this Twenty-ninth Day of August, 2000

Attest:

Q. TODD DICKINSON

Attesting Officer

Director of Patents and Trademarks